United States Patent
Lee et al.

(10) Patent No.: US 11,225,126 B2
(45) Date of Patent: Jan. 18, 2022

(54) MOTOR DRIVEN AIR VENT DEVICE FOR VEHICLE

(71) Applicants: Hyundai Motor Company, Seoul (KR); Kia Motors Corporation, Seoul (KR); NIFCO KOREA Inc., Chungcheongnam-do (KR); Hyundai Mobis Co., Ltd., Seoul (KR)

(72) Inventors: Young Ju Lee, Gyeonggi-do (KR); Pill Yoon Kim, Gyeonggi-do (KR); Byung Gyu Choi, Seoul (KR); Young Rok Lee, Gyeonggi-do (KR); Choong Yeul Kim, Gyeonggi-do (KR); Seung Hyeok Chang, Gyeonggi-do (KR); Jae Seob Choi, Gyeonggi-do (KR); Kwan Woo Lee, Gyeonggi-do (KR); Won Sik Kim, Gyeonggi-Do (KR); Ji Hun Lee, Chungcheongnam-do (KR)

(73) Assignees: Hyundai Motor Company, Seoul (KR); Kia Motors Corporation, Seoul (KR); NIFCO KOREA Inc., Chungcheongnam-do (KR); Hyundai Mobis Co., Ltd., Seoul (KR)

( * ) Notice: Subject to any disclaimer, the term of this patent is extended or adjusted under 35 U.S.C. 154(b) by 539 days.

(21) Appl. No.: 16/199,412

(22) Filed: Nov. 26, 2018

(65) Prior Publication Data

US 2020/0047593 A1 Feb. 13, 2020

(30) Foreign Application Priority Data

Aug. 8, 2018 (KR) .................. 10-2018-0092227

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC ............... B60H 1/3414; B60H 1/3421; B60H 2001/3471; B60H 2001/3478
(Continued)

(56) References Cited

U.S. PATENT DOCUMENTS

2009/0318069 A1* 12/2009 Konet ................. B60H 1/3428
454/155
2015/0328958 A1* 11/2015 Winget, Jr. ......... B60H 1/3414
454/155
(Continued)

FOREIGN PATENT DOCUMENTS

DE 20114844 U1 11/2001
DE 102015101101 B3 7/2016
(Continued)

*Primary Examiner* — Vivek K Shirsat
*Assistant Examiner* — Ko-Wei Lin
(74) *Attorney, Agent, or Firm* — Mintz Levin Cohn Ferris Glovsky and Popeo, P.C.; Peter F. Corless

(57) ABSTRACT

A motor driven air vent device for a vehicle can perform not only left/right angular rotation operation of a vertical wing for adjusting a left/right-directional airflow direction of air discharged indoors but also an opening/closing operation of a damper for interrupting or allowing an indoor discharge of air using a link bar for performing a straight line motion to the left or right thereof by driving a motor and a cam plate for angularly rotating by the link bar, etc. in a motor driven manner.

12 Claims, 13 Drawing Sheets

(58) Field of Classification Search
USPC .................................................. 454/155, 152
See application file for complete search history.

(56) References Cited

U.S. PATENT DOCUMENTS

| | | | |
|---|---|---|---|
| 2017/0021692 A1* | 1/2017 | Terai | B60H 1/3421 |
| 2017/0305238 A1* | 10/2017 | Brinas | B60H 1/3421 |
| 2017/0361683 A1* | 12/2017 | Brinas | B60H 1/3421 |
| 2018/0086179 A1* | 3/2018 | Mizuno | B60H 1/00828 |
| 2018/0170149 A1* | 6/2018 | Fidh | B60H 1/00871 |
| 2018/0170153 A1* | 6/2018 | Lee | B60H 1/3421 |
| 2019/0077218 A1* | 3/2019 | Rodriguez | B60H 1/00835 |
| 2019/0092137 A1* | 3/2019 | Lee | B60H 1/3421 |

FOREIGN PATENT DOCUMENTS

| | | |
|---|---|---|
| WO | 9400310 A1 | 1/1994 |
| WO | 2017016956 A1 | 2/2017 |

\* cited by examiner

[ right direction ]

[ damper close ]

MOTOR DRIVEN AIR VENT DEVICE FOR VEHICLE

CROSS-REFERENCE TO RELATED APPLICATION

This application claims under 35 U.S.C. § 119(a) the benefit of Korean Patent Application No. 10-2018-0092227 filed on Aug. 8, 2018, the entire contents of which are incorporated herein by reference.

BACKGROUND

(a) Technical Field

The present disclosure relates to a motor driven air vent device for a vehicle, more particularly, to the motor driven air vent device capable of improving left/right angular rotation of a vertical wing for adjusting a left/right-directional airflow direction discharged inside the vehicle (i.e., indoors) and an opening/closing operation of a damper for interrupting or allowing the indoor discharge of air in a motor driven manner.

(b) Description of the Related Art

Generally, an air vent for discharging air inside a vehicle (i.e., indoors) by operation of an air conditioner includes a center air vent mounted on a center fascia panel located in front of a driver seat and a passenger seat, and side vents mounted on crash pads in front of the driver seat and the passenger seat, etc.

The conventional air vent has been designed such that a number of horizontal wings and vertical wings is at least five or six, respectively and the height of the air vent is sufficiently large such that there is no problem in that the direction of the air discharged indoors can be easily adjusted toward the body of a vehicle occupant (lower: navel, upper: face). However, there is a disadvantage when the size of the air vent is large, which affects arranging the air vent along with the peripheral parts based on space and design constraints of the center fascia panel of the vehicle.

In addition, in the conventional air vent, since a driver has to adjust the up/down-directional airflow direction by vertically rotating angularly the horizontal wing directly through the knob, the driver may be distracted from the road temporarily so as to cause a problem for driving safety as well.

In addition, in the conventional air vent, since a plurality of horizontal wings and vertical wings are inevitably exposed, the center fascia panel or the crash pad occupies a wide mounting space to consequently reduce design space for the cluster, the AVN device, etc. located near the air vent.

Accordingly, the mounting location of the air vent is shifting to the lower region of the center fascia panel due to the enlargement of the cluster and the AVN (Audio, Video, Navigation) device mounted within the vehicle and particularly, a slim type air vent, which has a low height and a long length in the exterior design of the air vent, may be applied.

In the slim type air vent, only a single horizontal wing is located to be exposed indoors at the outlet of the air duct, and a plurality of vertical wings are located to adjust the left/right airflow direction at the rear location of the single horizontal wing.

As described above, only the single horizontal wing is located to be vertically adjustable at the outlet of the air duct, and the plurality of vertical wings are located to be invisible indoors at the rear location thereof, such that it is necessary to improve the left/right angular rotation operation for adjusting the left/right airflow direction in a motor driven manner.

The above information disclosed in this Background section is only for enhancement of understanding of the background of the disclosure and accordingly it can contain information that does not form the prior art that is already known in this country to a person of ordinary skill in the art.

SUMMARY

The present disclosure provides a motor driven air vent device for a vehicle, which can perform not only left/right angular rotation operation of a vertical wing for adjusting the left/right-directional airflow direction of air discharged into indoors but also the opening/closing operation of a damper for interrupting or allowing the indoor discharge of the air in a motor driven manner using a link bar for performing straight line motion to the left or the right by driving a motor and a cam plate for angularly rotating by the link bar, etc.

In order to achieve the object, the present disclosure provides a motor driven air vent device for a vehicle including a plurality of vertical wings simultaneously rotatable to a left or right thereof to be mounted at an outlet within an air duct; a motor mounted on an outer surface portion of the air duct; a cam plate formed with a guide hole to which two or more different guide paths are continuously connected to be rotatably located on the outer surface portion of the air duct; a connection shaft connected between a rotation point of the cam plate and one of the plurality of vertical wings; a first link assembly connected between a first output shaft of the motor and the cam plate to deliver a rotational force of the motor to the cam plate; a damper mounted to be openable/closable on a rear portion within the air duct; a second link assembly connected between a rotary shaft of the damper and the guide hole of the cam plate to rotate the damper from an opened location to a closed location or from the closed location to the opened location when passing through different guide paths of the guide hole; and a control module for applying a drive signal to the motor.

Preferably, the motor is provided with a second output shaft in addition to the first output shaft, and the second output shaft is connected with another one of the plurality of vertical wings.

In addition, a hinge pin is formed on the upper surface and lower surface of the plurality of vertical wings, respectively, and the hinge pin of each vertical wing is hinge-fastened to an upper support link and a lower support link that are fixed to the outlet of the air duct.

In addition, the upper support link is formed with a second fastening hole where the connection shaft extends from the rotation point of the cam plate and the second output shaft of the motor are penetrated in addition to a first fastening hole to which the hinge pin is fastened.

Preferably, a connection link for simultaneously rotating angularly the respective vertical wings is fastened at the eccentric location on the upper surfaces of the plurality of vertical wings.

Particularly, the first link assembly includes a drive link fastened to be angularly rotatable to the first output shaft of the motor; and a delivery link having one end portion hinge-connected with the drive link and having another end portion hinge-connected to the cam plate to deliver the rotational force of the drive link.

In addition, the second link assembly includes a damper opening/closing plate having the guide pin inserted into the guide hole of the cam plate formed on one end portion thereof and having a connection end formed to be protruded provided on another end portion thereof; and a damper opening/closing link having one end portion hinge-fastened to the connection end of the damper opening/closing plate and having another end portion eccentrically hinge-fastened to the rotary shaft of the damper.

Preferably, the rotary shaft of the damper is formed with an eccentric receiving case, and a ball formed on another end portion of the damper opening/closing link is hinge-fastened to the receiving case.

Particularly, the guide hole of the cam plate is composed of a first guide hole formed as a curved guide path to guide the damper to the opened location, and a second guide hole formed as a guide path that is bent at a predetermined angle on one end of the first guide hole to guide the damper to the closed location.

Preferably, the cam plate is further formed with a third guide hole that is the guide path bent at a predetermined angle on another end of the first guide hole.

The control module includes an airflow direction adjustable switch module mounted on a crash pad or steering wheel in front of a driver seat; and a controller for receiving an operation signal of the airflow direction adjustable switch module to apply a forward or backward drive signal to a motor.

Preferably, the airflow direction adjustable switch module includes a left-directional touch switch, a right-directional touch switch, and an auto-operational touch switch, and is configured as a touch sensor module in which a touch sensor is located on a bottom of each touch switch.

The present disclosure provides the following effects through the above configurations.

First, it is possible to angularly rotate the vertical wing of the air vent to the left or right thereof by the motor and the link assembly only using the touch switch operation of the driver, thus providing the convenience that automatically adjusts the left/right airflow direction of the air discharged into indoors in the desired direction.

Second, it is possible not only to adjust the left/right airflow direction for the vertical wing of the air vent but also to automatically perform the opening/closing operation of the damper for allowing or interrupting the indoor discharge of the air, thus further enhancing the user convenience.

Third, it is possible for a driver to touch only the touch switch while continuing to face forward during driving to automatically perform the adjustment of the left/right airflow direction and the opening/closing operation of the damper, thus achieving driving safety.

Fourth, it is possible to automatically perform the left/right-directional angular rotation operation of the vertical wing and the opening/closing operation of the damper in which a driver directly operates manually the vertical wing included in the conventional general air vent or slim type air vent, thus enhancing convenience of the vehicle.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
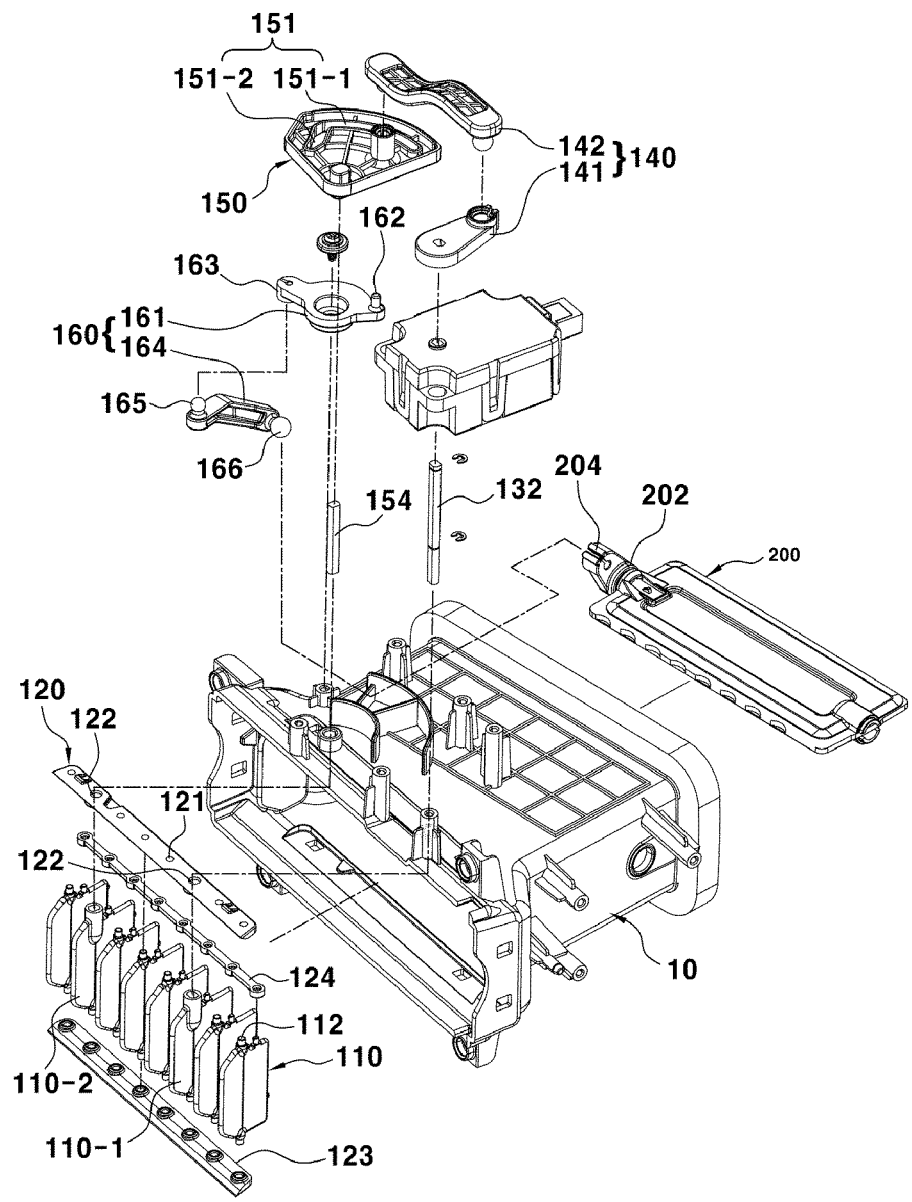
FIGS. 1 and 2 are exploded perspective views of a motor driven air vent device for a vehicle in accordance with an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings.

Figure 2:
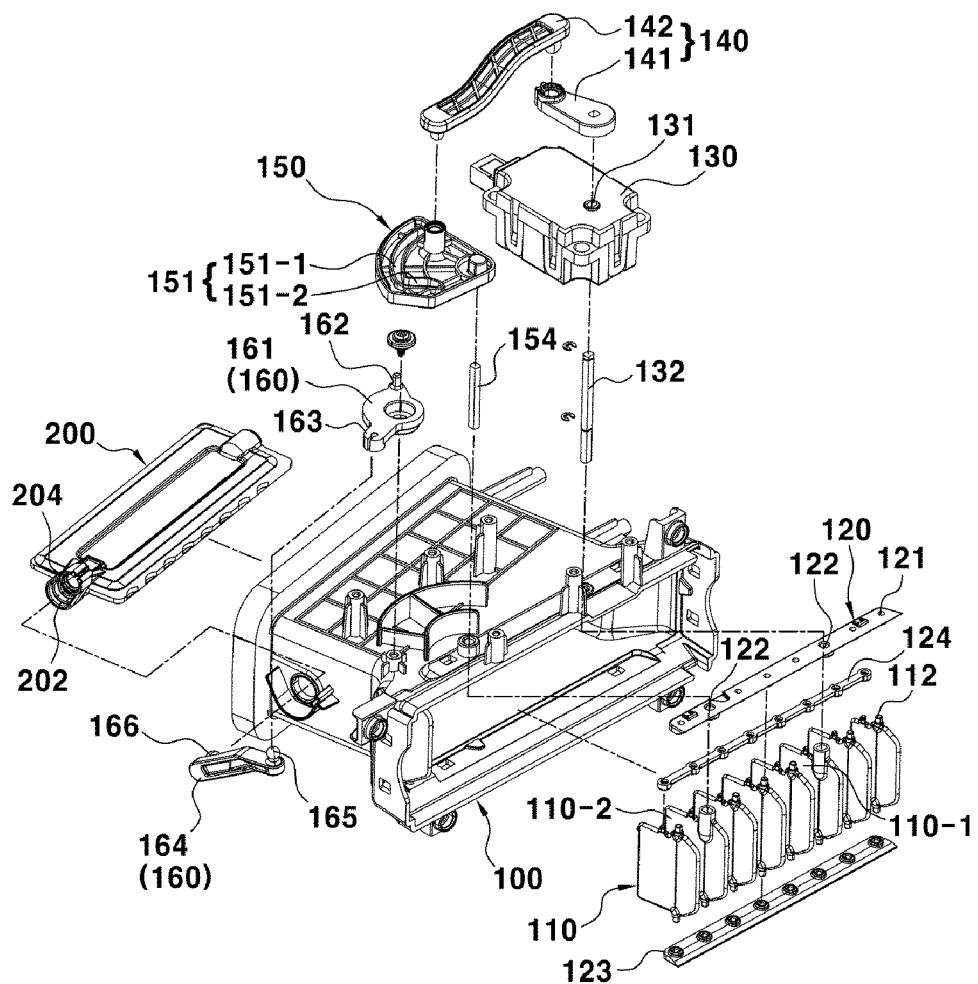
Figure 3:
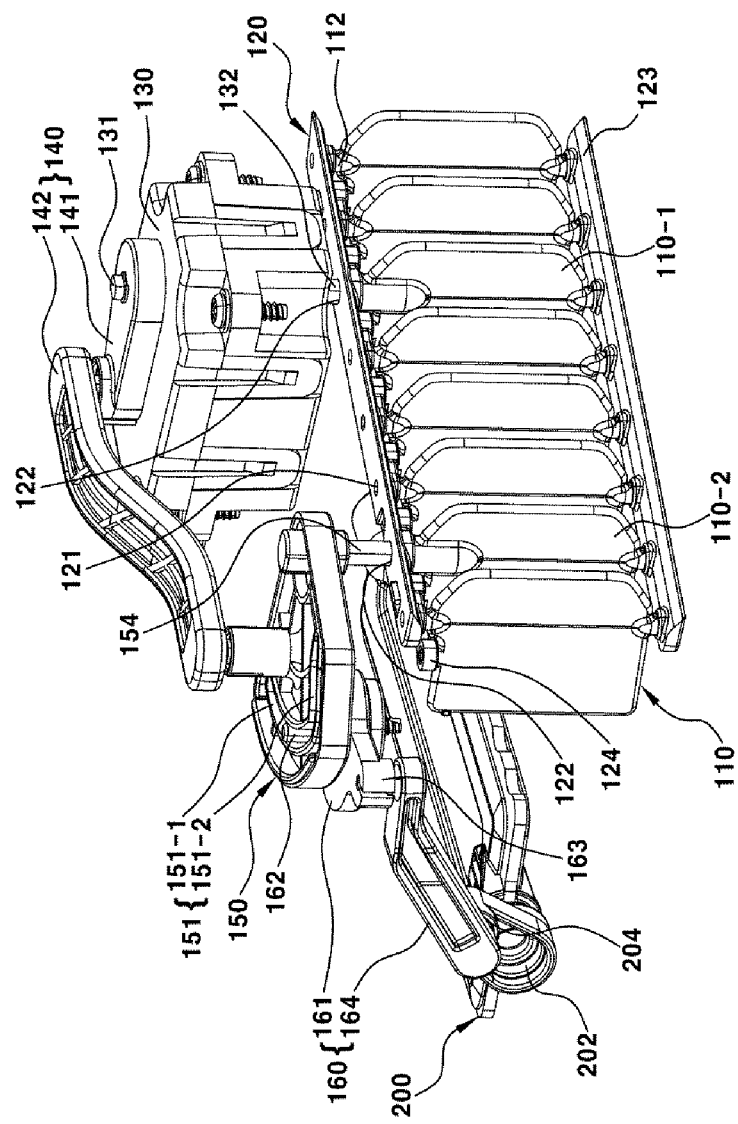
FIGS. 3 to 5 are perspective views illustrating the assembled state of the motor driven air vent device for the vehicle in accordance with an embodiment of the present disclosure.
Figure 4:
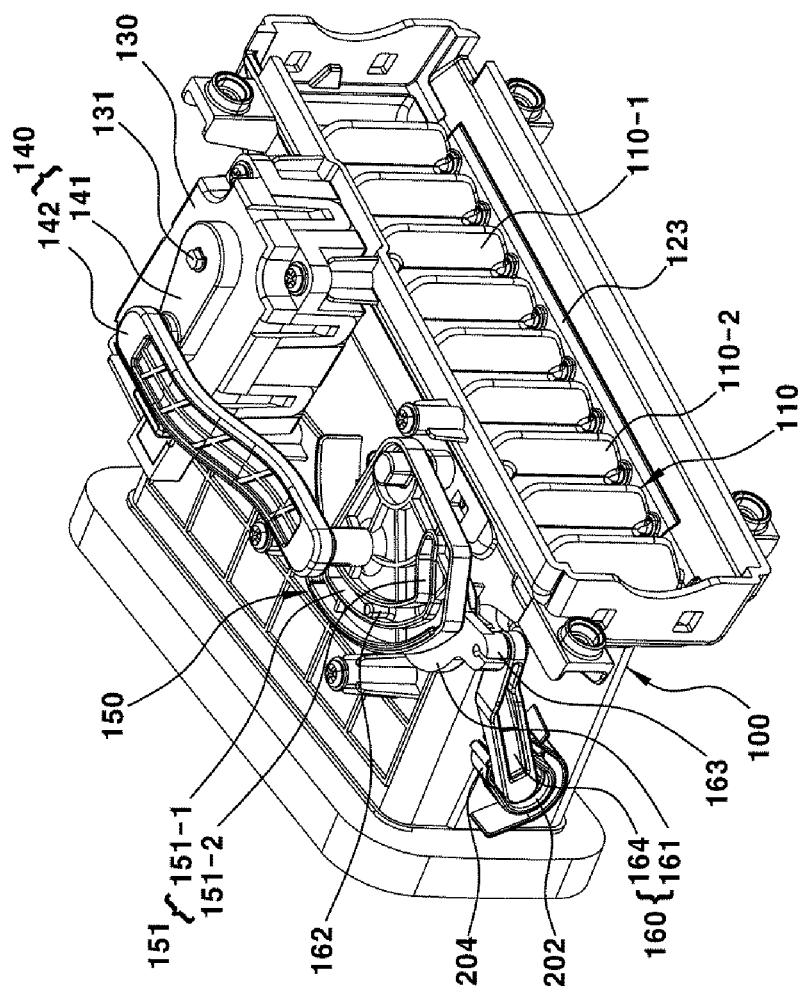
Figure 5:
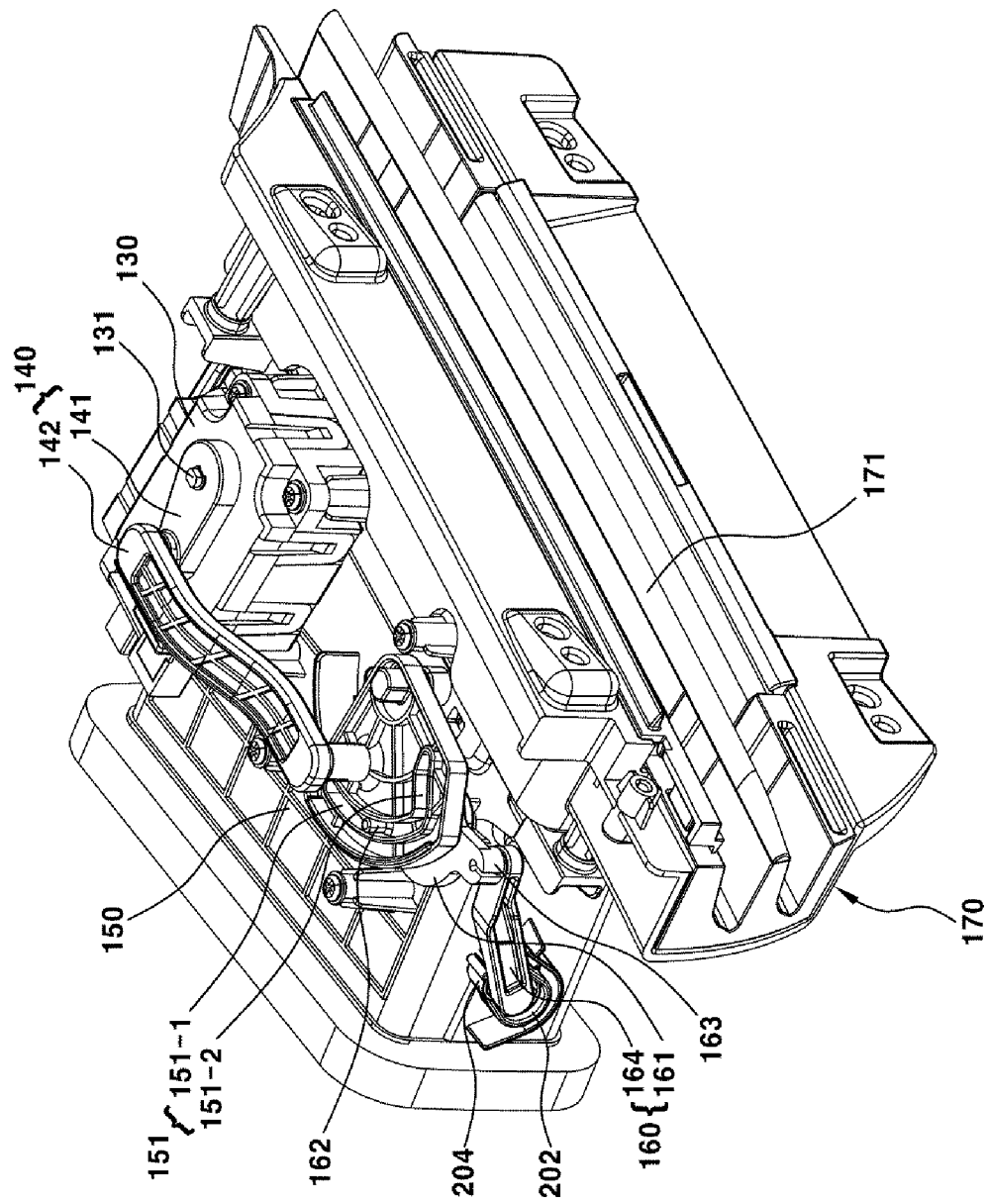

FIGS. 1 and 2 are exploded perspective views of a motor driven air vent device for a vehicle in accordance with an embodiment of the present disclosure; FIGS. 3 to 5 illustrate the assembled state thereof; and reference numeral 100 in each drawing refers to an air duct for discharging air indoors in the vehicle.

A plurality of vertical wings 110 are mounted to be simultaneously rotatable to the left or right thereof at a certain angle at the outlet of the air duct 100.

For this purpose, a hinge pin 112, which serves as the rotation point of each vertical wing 110, is integrally formed to be protruded on the upper surface and lower surface of the plurality of vertical wings 110, respectively, and an upper support link 120 and a lower support link 123 to which the hinge pin 112 of the vertical wing 110 is hinge-fastened are mounted on the upper surface and lower surface of the outlet of the air duct 100, respectively.

In particular, the upper support link 120 is formed with a second fastening hole 122 where a vertical-directional connection shaft 154 mounted on the rotation point of a cam plate 150 and a second output shaft 132 of a motor 130 penetrate, as will be described later, in addition to a first fastening hole 121 to which the hinge pin 112 of each vertical wing 110 is fastened.

In order to adjust the airflow direction of the air flowing toward the outlet of the air duct 100 to the left or right thereof, the plurality of vertical wings 110 should be simultaneously rotated to the left or right thereof at a certain angle, and for this purpose, the respective vertical wings 110 are connected together by a separate connection link 124.

That is, one connection link 124 is hinge-fastened to the eccentric location from the hinge pin 112 of the each vertical wing 110, such that when any one vertical wing 110 rotates around the hinge pin 112, the connection link 124 rotates the remaining vertical wings 110 at a certain angle while performing the straight line motion.

The present disclosure is configured to improve the left or right rotation operation of the respective vertical wings 110 mounted at the outlet of the air duct 100 in the motor driven manner.

For this purpose, the motor 130 is mounted at one side of the upper surface of the air duct 100.

The motor 130 is a motor having a bidirectional output shaft such as a first output shaft 131 at the upper side thereof and a second output shaft 132 at the lower side thereof, and is fixedly mounted at one side of the upper surface of the air duct 100.

In particular, the second output shaft 132 of the motor 130 penetrates the upper surface of the air duct 100, and simultaneously, penetrates the second fastening hole 122 formed on the upper support link 120 to be inserted into and fixedly fastened to the upper surface of one vertical wing 110-1 of the plurality of vertical wings 110.

A cam plate 150 is rotatably mounted at another side of the upper surface of the air duct 100.

That is, one side portion of the cam plate 150, which serves as the rotation point, is hinge-fastened to the upper surface of the air duct 100, and particularly, a guide hole 151 to which two or more different guide paths are continuously connected is formed to penetrate at another side portion of the cam plate 150.

For example, the guide hole 151 is formed of the shape that a curved first guide hole 151-1 and a straight-lined second guide hole 151-2 that is bent at one end of the first guide hole 151-1 are connected by one.

In particular, the guide hole 151 of the cam plate 150 is divided into the first guide hole 151-1 formed as the curved guide path to guide a damper to the opened location and the second guide hole 151-2 formed as the straight-lined guide path that is bent at a predetermined angle at one end of the first guide hole 151-1 to guide the damper to the closed location.

Further, the upper end portion of the connection shaft 154 is fastened to the rotation point of the cam plate 150, and the lower end portion of the connection shaft 154 penetrates the second fastening hole 122 formed on the upper support link 120 to be inserted into and fixedly fastened to the upper surface of another one vertical wing 110-2 of the plurality of vertical wings 110.

A first link assembly 140 for delivering the rotational force of the motor 130 to the cam plate 150 is connected between the first output shaft 131 of the motor 130 and the cam plate 150.

In particular, the first link assembly 140 is composed of a drive link 141 rotatably fastened to the first output shaft 131 of the motor 130 at a certain angle, and a straight-lined delivery link 142 having one end portion hinge-fastened to the drive link 141 and having another end portion hinge-fastened to the cam plate 150.

Accordingly, since the second output shaft 132 rotates to the left or right thereof by driving the motor 130, and simultaneously, the lower end portion of the second output shaft 132 has been connected to the one vertical wing 110-1 of the plurality of vertical wings 110, the one vertical wing 110-1 upon rotation of the second output shaft 132 also rotates to the left or right thereof at a certain angle, and simultaneously, the connection link 124 performs the straight line motion upon rotation of the one vertical wing 110-1.

In addition, since the entire vertical wings 110 including the one vertical wing 110-1 have been connected by the one connection link 124, the remaining vertical wings 110 also rotate to the left or right thereof at a certain angle together by the straight line motion of the connection link 124.

In particular, the rotational force of the second output shaft 132 of the motor 130 by itself can be insufficient to rotate the entire vertical wings 110.

For this purpose, when the first output shaft 131 in addition to the second output shaft 132 rotates by driving the motor 130, the drive link 141 pulls or pushes the delivery link 142 while rotating at a certain angle, and the cam plate 150 rotates to the left or right thereof at a certain angle around the rotation point by the pulling or pushing operation of the delivery link 142.

In addition, as described above, since the upper end portion of the connection shaft 154 is fastened to the rotation point of the cam plate 150, and the lower end portion of the connection shaft 154 has been connected to the another one vertical wing 110-2 of the plurality of vertical wings 110, the connecting shaft 154 rotates in the same direction together upon rotation of the cam plate 150, and simultaneously, the another one vertical wing 110-2 of the plurality of vertical wings 110 also rotates to the left or right thereof at a certain angle.

In addition, since the entire vertical wings 110 including the another one vertical wing 110-2 have been connected by the one connection link 124, and as the another one vertical wing 110-2 upon rotation of the first output shaft 131 also rotates at a certain angle, simultaneously, the connection link 124 performs the straight line motion upon rotation of the another one vertical wing 110-2, and accordingly, the remaining vertical wings 110 also rotate to the left or right thereof at a certain angle together by the straight line motion of the connection link 124.

As described above, the rotational force that is output from the second output shaft 132 of the motor 130 is delivered to the one vertical wing 110-1 of the plurality of vertical wings 110, and simultaneously, the rotational force that is output from the first output shaft 131 is delivered to the another one vertical wing 110-2 of the plurality of vertical wings 110, such that the entire vertical wings 110 can easily rotate simultaneously to the left or right thereof at a certain angle and accordingly, the indoor discharge direction of the air can be easily adjusted to the left or right thereof.

As described above, the present disclosure can implement not only the left/right rotation operation of the vertical wing for adjusting the left/right-directional airflow direction of the air discharged indoors but also the opening/closing operation of the damper for interrupting or allowing the indoor discharge of the air in the motor driven manner.

That is, it is possible to implement the opening/closing operation of a damper 200 mounted to be openable/closable on the rear portion within the air duct 100 in the motor driven manner.

For this purpose, a second link assembly 160 for operating the opening/closing of the damper 200 is connected between a rotary shaft 202 of the damper 200 and the guide hole 151 of the cam plate 150, and the second link assembly 160 is composed of a damper opening/closing plate 161 and a damper opening/closing link 164.

In particular, the damper opening/closing plate 161 of the second link assembly 160 has the central portion rotatably hinge-fastened to the air duct 100 at a certain angle, has a guide pin 162 inserted into the guide hole 151 of the cam plate 150 formed on one end portion thereof, and has the connection end 163 is formed to be protruded provided on another end portion thereof.

In addition, the damper opening/closing link 164 is a link arranged in the forward/backward direction on one side portion of the air duct 100, has a ball 165 hinge-fastened to the connection end 163 of the damper opening/closing plate 161 formed on the upper surface of the one end portion thereof (the front end portion), and has a ball 166 eccentrically hinge-fastened to the rotary shaft 202 of the damper 200 formed on the inside surface of another end portion thereof (the rear end portion).

Preferably, an eccentric receiving case 204 is integrally formed on the upper portion of the rotary shaft 202 of the damper 200, such that the ball 166 formed on another end portion of the damper opening/closing link 164 is inserted into and fastened to the receiving case 204 as a hinge.

Accordingly, the first output shaft 131 rotates by driving the motor 130, and simultaneously, the drive link 141 rotates at a certain angle to pull the delivery link 142, and then when the delivery link 142 rotates the cam plate 150 and the guide pin 162 of the damper opening/closing plate 161 is located in the first guide hole 151-1 of the cam plate 150, the damper 200 is maintained to be opened.

On the other hand, the first output shaft 131 further rotates angularly by driving the motor 130, and simultaneously, the drive link 141 further rotates at a certain angle or more to further pull the delivery link 142 and then the delivery link 142 rotates the cam plate 150 at a greater angle, such that when the guide pin 162 of the damper opening/closing plate 161 is moved to the second guide hole 151-2 of the cam plate 150, the damper 200 performs the rotation operation to the closed location.

The automatic opening/closing operation of the damper 200 will be easily understood through the operation procedure described below.

The motor driven air vent device of the present disclosure includes a control module 300 for applying a drive signal to the motor so that the vertical-directional rotation operation of the vertical wings is automatically performed by driving the motor.

Figure 12:
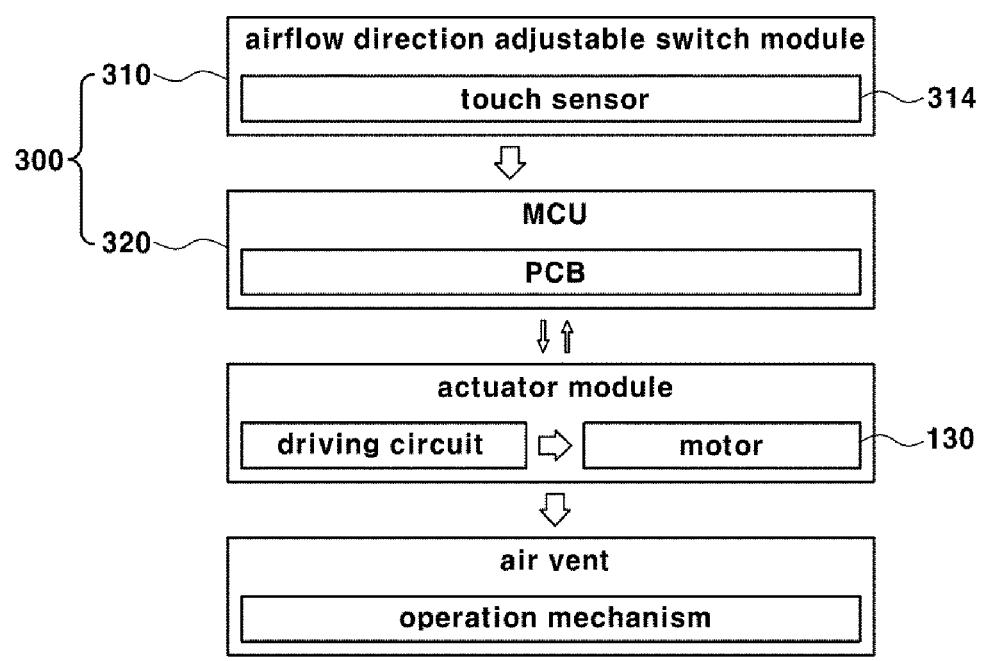
FIG. 12 is a control block view of the motor driven air vent device for the vehicle in accordance with the present disclosure.
Figure 13:
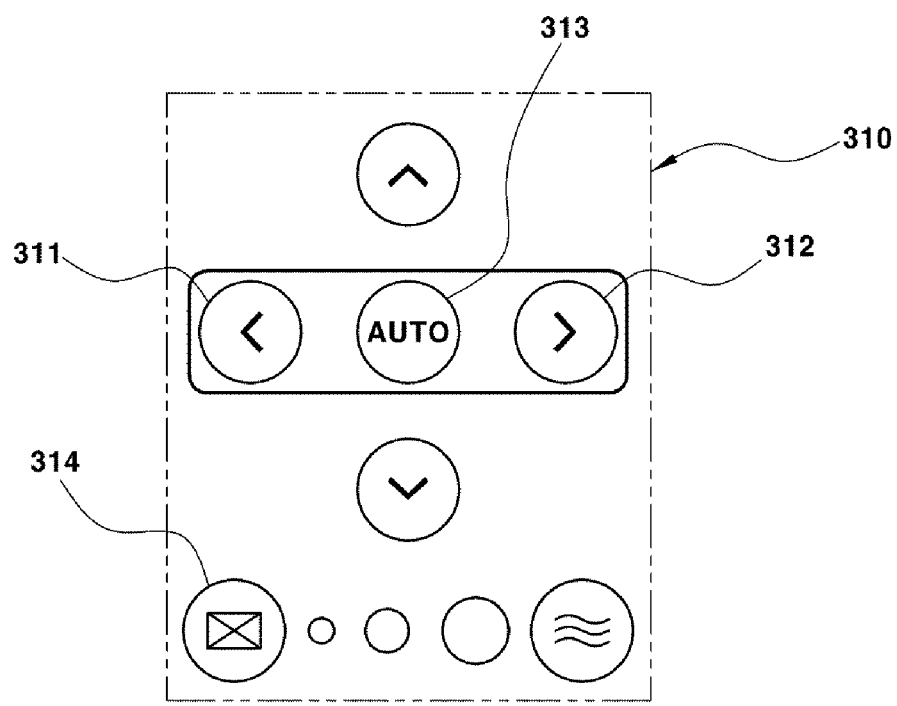
FIG. 13 is a schematic view illustrating a touch type airflow direction adjustable switch for operating the motor driven air vent device for the vehicle in accordance with the present disclosure.

Referring to FIGS. 12 and 13, the control module 300 is configured to include an airflow direction adjustable switch module 310 mounted around the driver seat such as a crash pad or steering wheel in front of the driver seat, and a controller 320 for receiving the operation signal of the airflow direction adjustable switch module 310 to apply a forward (e.g., counterclockwise) or reverse (e.g., clockwise) drive signal to the motor 130.

Preferably, the airflow direction adjustable switch module 310 includes an left-directional touch switch 311, a right-directional touch switch 312, and an auto-operational touch switch 313 in the predetermined arrangement, can be configured as a touch sensor module on which a touch sensor 315 mounted on the bottom of the respective touch switches 311, 312, 313, 314 to detect located user's touch, and can be additionally provided as a button type and/or with rotary switch modules.

Meanwhile, in the present disclosure, as illustrated in FIG. 5, a horizontal wing module 170 is assembled on the front location of the vertical wing 110, and only a single horizontal wing 171 of the horizontal wing modules 170 is exposed to the outside (i.e., indoors), such that it is possible to express a simple aesthetic sense of the slim air vent as if there is only one horizontal wing in appearance.

Herein, the operation procedure of the motor driven air vent of the present disclosure composed of the above configuration will be described as follows.

FIGS. 6 to 10 illustrate the operation states of the motor driven air vent device for the vehicle in accordance with an embodiment of the present disclosure.

Adjustment for the Right-Directional Airflow Direction of the Air

Figure 6:
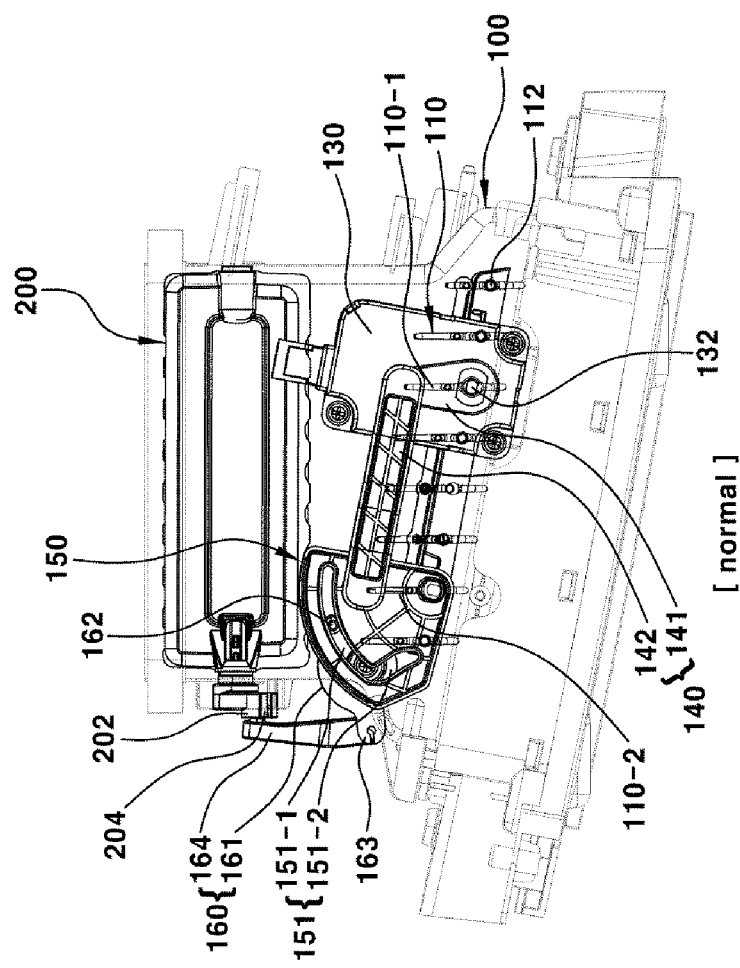
FIGS. 6 to 9 are plan sectional views illustrating the operation state of the motor driven air vent device for the vehicle in accordance with an embodiment of the present disclosure.

Referring to FIG. 6, when the vertical wings 110 are in the neutral arrangement state that is parallel to the forward/ backward longitudinal direction of the air duct 100 and the damper 200 is also maintained to be opened, the air is straightly discharged indoors.

In this state, when the driver intends to adjust the indoor discharge direction of the air to the right thereof by touching the right-directional touch switch 312 of the airflow direction adjustable switch module 310, the controller 320 recognizes the touch signal and then applies the forward (e.g., counterclockwise) drive signal to the motor 130.

Then, the second output shaft 132 rotates to the left thereof according to the rotation operation of the motor 130 in the counterclockwise direction, simultaneously, the one vertical wing 110-1 connected with the lower end portion of the second output shaft 132 rotates (the rear end portion of the vertical wing angularly rotates to the left thereof and the front end portion thereof to the right thereof), and simultaneously, the connection link 124 performs the straight line motion to the left thereof upon rotation of the one vertical wing 110-1.

Figure 7:
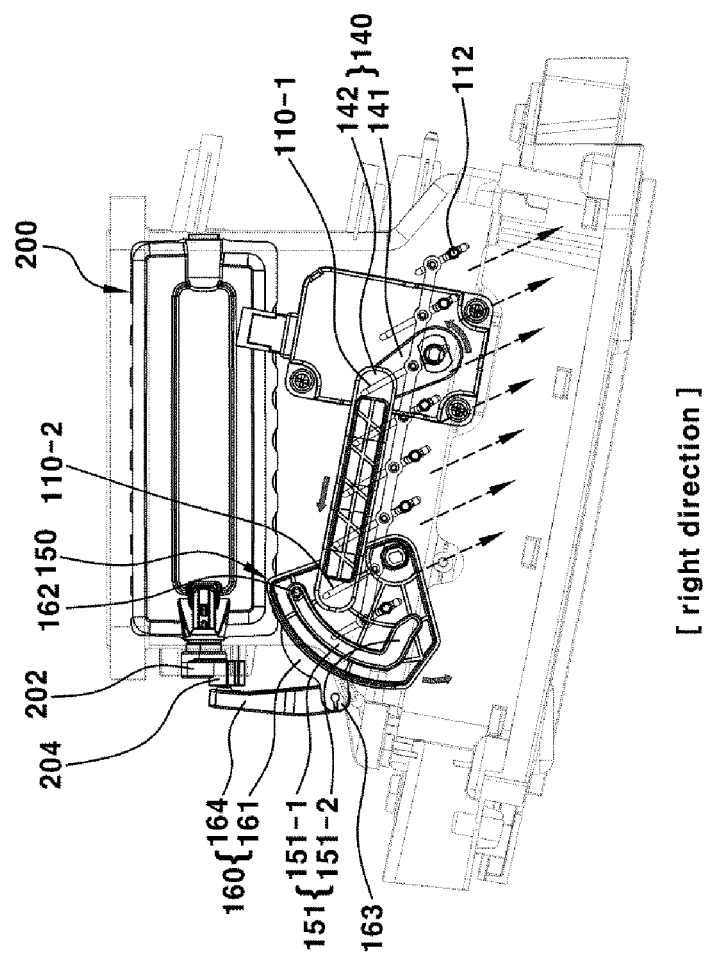

Accordingly, since the entire vertical wings 110 including the one vertical wing 110-1 have been connected by the one connection link 124, the entire vertical wings 110 rotate together at a certain angle by the straight line motion of the connection links 124, and as illustrated in FIG. 7, the respective vertical wings 110 are arranged so that the rear end portion thereof rotates to the left thereof and the front end portion rotates to the right thereof at a certain angle around the hinge pin 112.

In particular, only the rotational force of the second output shaft 132 of the motor 130 by itself can be insufficient to rotate the entire vertical wings 110.

For this purpose, when the first output shaft 131 in addition to the second output shaft 132 rotates by driving the motor 130, as illustrated in FIG. 7, the drive link 141 pushes the delivery link 142 while rotating to the left thereof at a certain angle, and the cam plate 150 rotates to the left thereof at a certain angle around the rotation point by the pushed operation of the delivery link 142.

Simultaneously, the vertical rotary shaft connected to the rotation point of the cam plate 150 also rotates to the left thereof, and the another one vertical wing 110-2 connected with the lower end portion of the connection shaft 154 rotates in the same direction.

Then, since the entire vertical wings 110 including the another one vertical wing 110-2 have been connected by the one connection link 124, the connection link 124 more easily performs the straight line motion to the left thereof by the rotational force of the another one vertical wing 110-2 and accordingly, as illustrated in FIG. 7, the respective vertical wings 110 are arranged so that the rear end portion thereof easily rotates to the left thereof and the front end portion thereof easily rotates to the right thereof around the hinge pin 112.

In particular, the guide pin 162 of the damper opening/closing plate 161 of the second link assembly 160 is only located on one end of the section of the first guide hole 151-1 of the cam plate 150 and does not affect the movement of the damper opening/closing plate 161 and damper opening/closing link 164 of the second line assembly 160, such that the damper 200 continues to maintain the opened state.

As described above, the rotational force that is output from the second output shaft 132 of the motor 130 is delivered to the one vertical wing 110-1 of the plurality of vertical wings 110, and simultaneously, the rotational force that is output from the first output shaft 131 is delivered to the another one vertical wing 110-2, such that the entire vertical wings 110 can easily rotate simultaneously to the arrangement location for the right-directional discharge of the air and accordingly, the indoor discharge direction of the air can be easily and automatically adjusted to the right thereof.

Adjustment for the Left-Directional Airflow Direction of the Air

When the driver intends to adjust the indoor discharge direction of the air to the left thereof by touching the left-directional touch switch 311 of the airflow direction adjustable switch module 310, the controller 320 recognizes the touch signal and then applies the reverse (e.g., clockwise) drive signal to the motor 130.

Then, the second output shaft 132 rotates to the right thereof according to the clockwise rotation operation of the motor 130, simultaneously, the one vertical wing 110-1 connected with the lower end portion of the second output shaft 132 rotates (the rear end portion of the vertical wing rotates to the right thereof and the front end portion thereof rotates to the left thereof around the hinge pin) at a certain angle, and simultaneously, the connection link 124 performs the straight line motion to the right thereof upon rotation of the one vertical wing 110-1.

Figure 8:
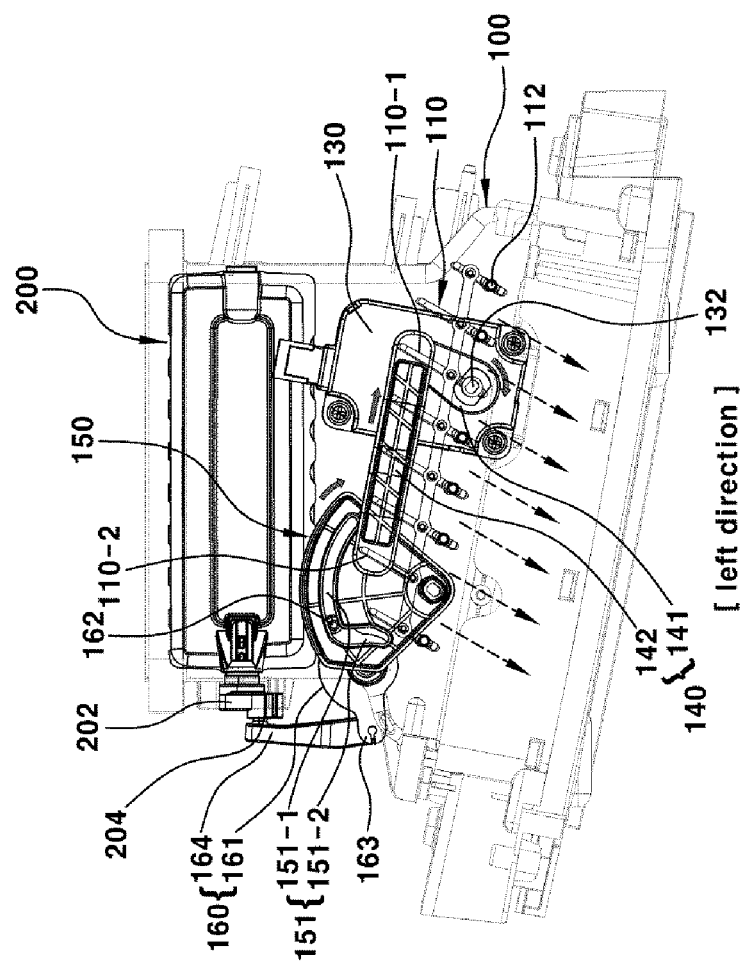

Accordingly, since the entire vertical wings 110 including the one vertical wing 110-1 have been connected by the one connection link 124, the entire vertical wings 110 rotate together by the straight line motion of the connection link 124, and as illustrated in FIG. 8, the respective vertical wings 110 are arranged so that the rear end portion thereof rotates to the right thereof and the front end portion thereof rotates to the left thereof around the hinge pin 112.

In particular, the rotational force of the second output shaft 132 of the motor 130 by itself can be insufficient to rotate the entire vertical wings 110.

For this purpose, when the first output shaft 131 in addition to the second output shaft 132 rotates by driving the motor 130, as illustrated in FIG. 8, the drive link 141 pulls the delivery link 142 while rotating to the right thereof at a certain angle, and the cam plate 150 rotates to the right thereof at a certain angle around the rotation point due to the pull motion of the delivery link 142.

Simultaneously, the vertical rotary shaft connected to the rotation point of the cam plate 150 also rotates to the right thereof, and the another vertical wing 110-2 connected with the lower end portion of the connection shaft 154 also rotates in the same direction.

Then, since the entire vertical wings 110 including the another one vertical wing 110-2 have been connected by the one connection link 124, the connection link 124 more easily performs the straight line motion to the right thereof by the rotational force of the another one vertical wing 110-2, and accordingly, as illustrated in FIG. 8, the respective vertical wings 110 are arranged so that the rear end portion thereof easily rotates to the right thereof and the front end portion thereof easily rotates to the left thereof around the hinge pin 112.

In particular, the guide pin 162 of the damper opening/closing plate 161 of the configuration of the second link assembly 160 is only located on another end of the section of the first guide hole 151-1 of the cam plate 150 and does not affect the movement of the damper opening/closing plate 161 and damper opening/closing link 164 of the second link assembly 160, such that the damper 200 continues to maintain the opened state.

As described above, the rotational force that is output from the second output shaft 132 of the motor 130 is delivered to the one vertical wing 110-1 of the plurality of vertical wings 110, and simultaneously, the rotational force that is output from the first output shaft 131 is delivered to the another one vertical wing 110-2 of the plurality of vertical wings 110, such that the entire vertical wings 110 can easily rotate simultaneously to the arrangement location for the left-directional discharge of the air and accordingly, the indoor discharge direction of the air can be easily and automatically adjusted to the left thereof.

Repetitive Adjustment for the Right/Left-Directional Airflow Direction of the Air For example, when the driver gently touches the auto-operational touch switch 313 of the airflow direction adjustable switch module 310 for a predetermined time or more, the controller recognizes the touch signal as the signal that automatically intends to repeat the right-directional discharge and left-directional discharge of the air to alternatively apply the forward drive signal and the reverse drive signal to the motor 130 at a certain cycle.

Accordingly, the motor 130 repeatedly rotates in the forward and reverse directions to repeat the operation for the right/left-directional arrangements of the vertical wings 110 as described above, such that the air can be repeatedly discharged toward the left and right spaces indoors, and in this case, it can be very useful for uniformly discharging cooling or heating air over the entire indoor spaces of the vehicle.

Closing Operation of the Damper

Figure 9:
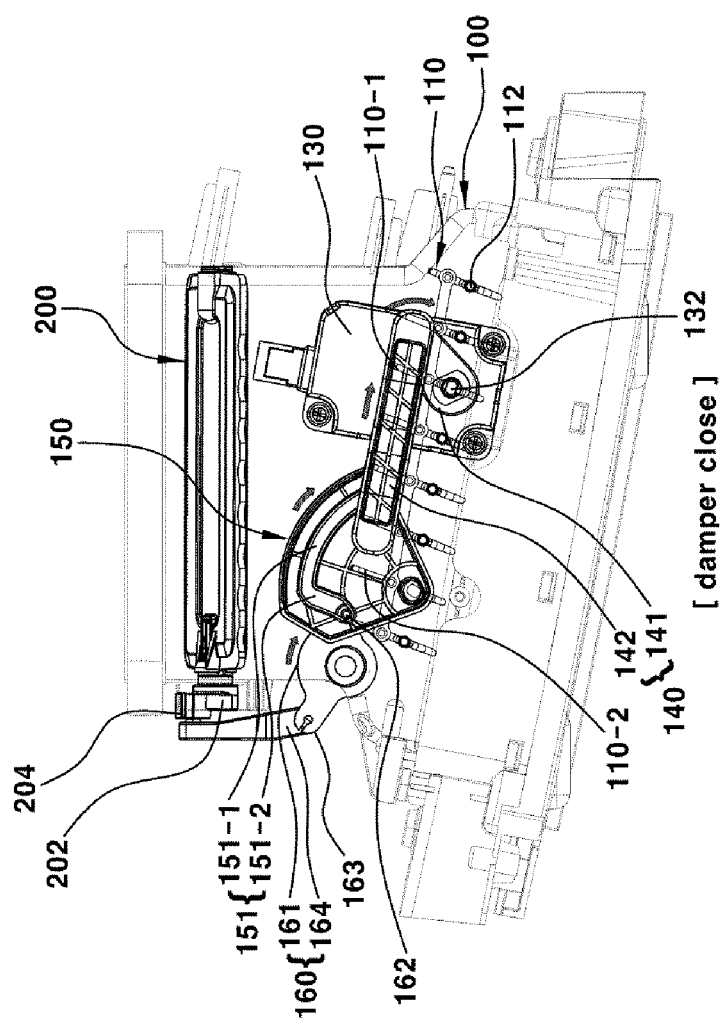
Figure 10:
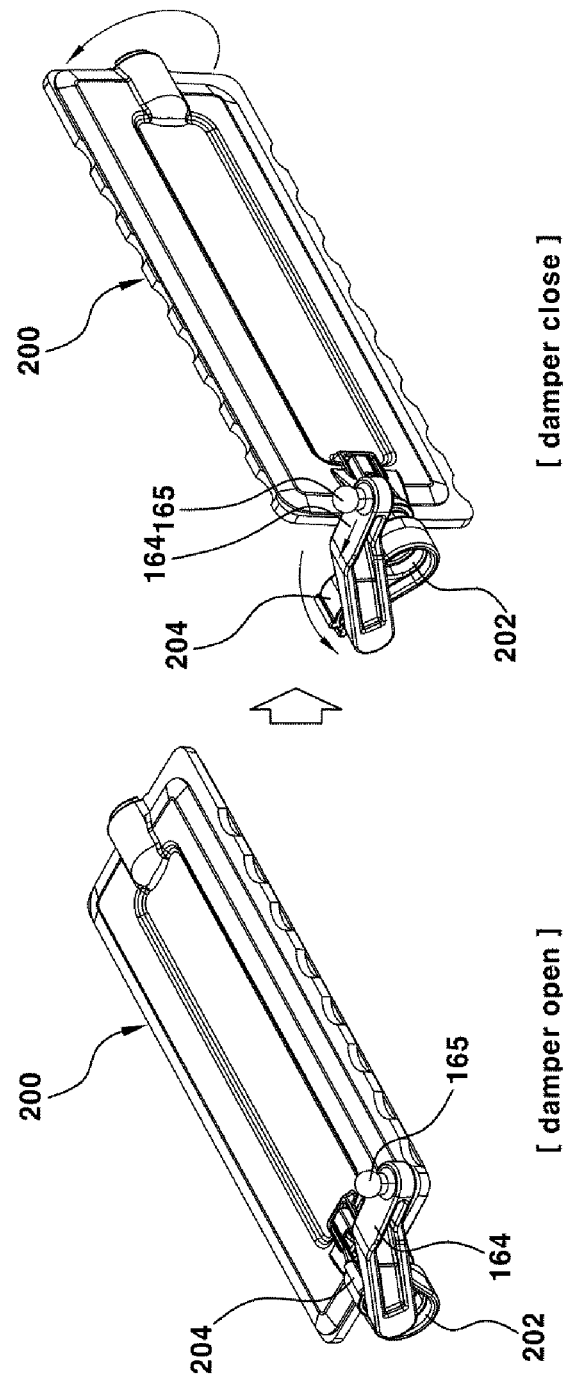
FIG. 10 is a perspective view illustrating the opening/closing operation of a damper of the motor driven air vent device for the vehicle in accordance with an embodiment of the present disclosure.

FIGS. 9 and 10 illustrate the opening/closing operation of the damper of the motor driven air vent device for the vehicle in accordance with an embodiment of the present disclosure.

According to an embodiment of the present disclosure, the closing operation of the damper 200 can be performed at the location where the air discharge direction of the vertical wings 110 has been adjusted to the left thereof.

For example, when the driver touches the damper opening/closing touch switch 314 to interrupt the indoor discharge of the air, the controller 320 recognizes the touch signal to apply the reverse (e.g., clockwise) drive signal to the motor 130, and applies a drive signal rotating at a greater angle as compared with the case of adjusting the left-directional airflow direction of the vertical wing thereto.

Then, the first output shaft 131 angularly rotates at a greater angle than the case of adjusting the left-directional airflow direction of the vertical wing according to the clockwise rotation operation of the motor 130, and simultaneously, the drive link 141 also rotates angularly at a greater angle to maximally pull the delivery link 142 and then, the delivery link 142 angularly rotates maximally the cam plate 150 in the clockwise direction thereof.

In particular, as illustrated in FIG. 9, the guide pin 162 of the damper opening/closing plate 161 is moved from the first guide hole 151-1 of the cam plate 150 to the second guide hole 151-2 thereof, such that the damper opening/closing plate 161 angularly rotates in the clockwise direction.

Accordingly, as the damper opening/closing plate 161 angularly rotates in the clockwise direction, the connection end 163 formed on another end portion of the damper opening/closing plate 161 pushes the damper opening/closing link 164 rearwards.

Then, as illustrated in FIG. 10, the damper opening/closing link 164 is pushed rearwards to push the receiving case 204 eccentrically formed to the rotary shaft 202 of the damper 200 rearwards, such that the rotary shaft 202 of the damper 200 angularly rotates.

That is, the damper 200 is horizontally arranged along the forward/backward direction of the air duct 100, and angularly rotates to the closed location that is vertically arranged by the operation that the damper opening/closing link 164 pushes the receiving case 204.

As described above, the damper 200 is vertically arranged inside the air duct 100 to interrupt the air passage of the air duct, such that the indoor discharge of air can be easily interrupted.

Figure 11:
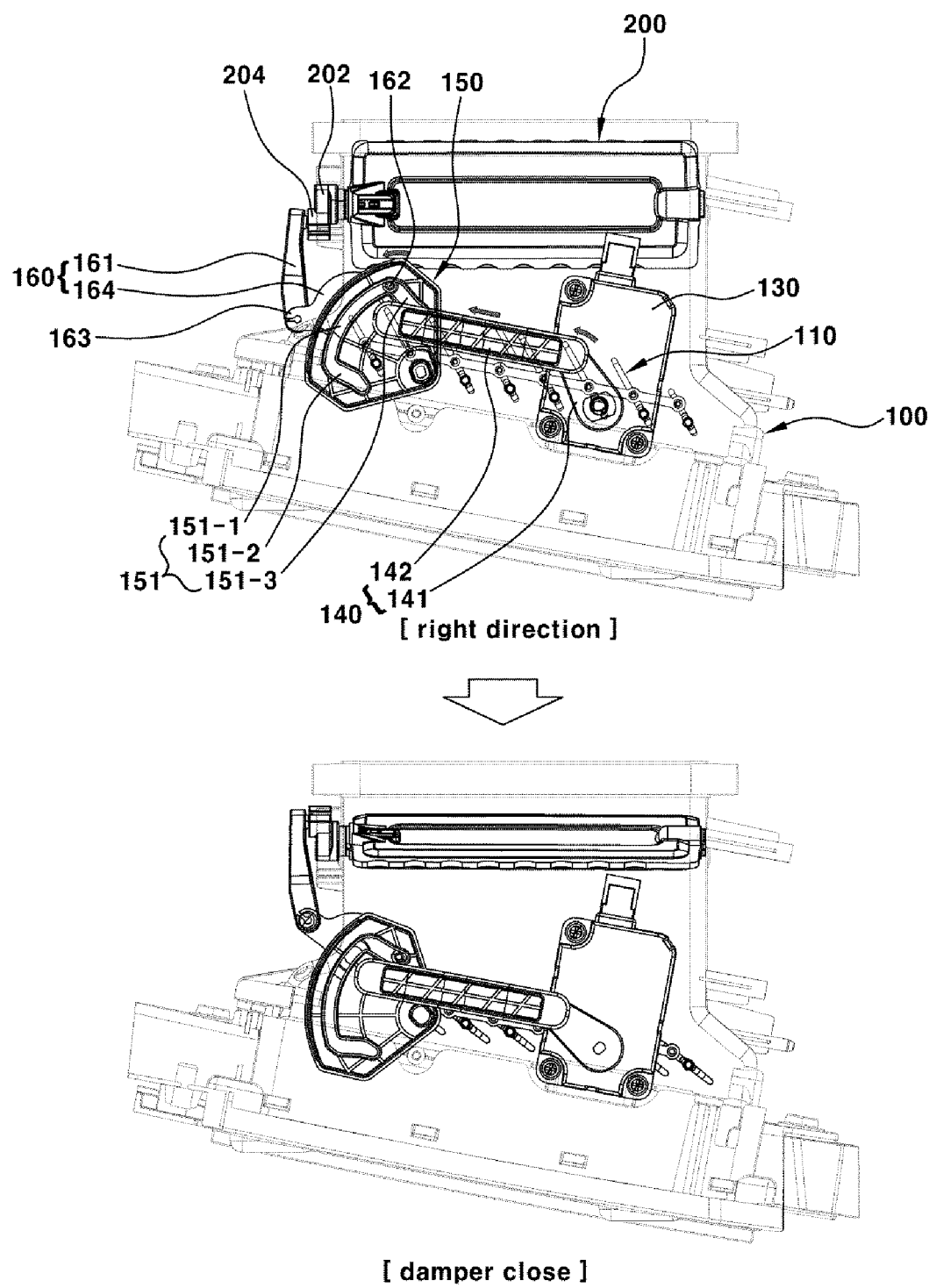
FIG. 11 is a plan sectional view illustrating the operation state of the motor driven air vent device for the vehicle in accordance with another embodiment of the present disclosure.

FIG. 11 illustrates the operation state of the motor driven air vent device for the vehicle in accordance with another embodiment of the present disclosure.

In another embodiment of the present disclosure, as illustrated in FIG. 11, a straight-lined third guide hole 151-3, which is bent at another end of the first guide hole 151, can be further formed on the cam plate 150 in addition to the second guide hole 151-2, which is bent at one end of the first guide hole 151-1.

Accordingly, according to another embodiment of the present disclosure, the closing operation of the damper 200 can be performed even on the location where the air discharge direction of the vertical wings 110 has been adjusted to the right thereof.

For this purpose, the first output shaft 131 angularly rotates at a greater angle than the case of adjusting the right-directional airflow direction of the vertical wing according to the clockwise rotation operation of the motor 130, while simultaneously, the drive link 141 also rotates angularly at a greater angle to maximally push the delivery link 142, and then, the delivery link 142 angularly rotates maximally the cam plate 150 in the counterclockwise direction.

In particular, as illustrated in FIG. 11, the guide pin 162 of the damper opening/closing plate 161 is moved from the first guide hole 151-1 of the cam plate 150 to the third guide hole 151-3 thereof, such that the damper opening/closing plate 161 angularly rotates in the clockwise direction.

Accordingly, as the damper opening/closing plate 161 angularly rotates in the clockwise direction, the connection end 163 formed at another end portion of the damper opening/closing plate 161 pushes the damper opening/closing link 164 rearwards.

Accordingly, the damper 200 is horizontally arranged along the forward/backward direction of the air duct 100 as described above, and the damper opening/closing link 164 rotates to the closed location that is vertically located by the operation that the damper opening/closing link 164 pushes the receiving case 204.

According to another embodiment of the present disclosure, the closing operation of the damper 200 can be easily performed even when the air discharge direction of the vertical wings 110 has been adjusted to the right thereof.

As described above, it is possible to automatically perform not only the adjustment of the left/right airflow direction for the vertical wing 110 but also the opening/closing operation of the damper 200 for allowing or interrupting the indoor discharge of the air, thus further enhancing user convenience.

The foregoing description illustrates the present disclosure. In addition, the foregoing description illustrates and explains only the preferred embodiments of the present disclosure, and the present disclosure can be used in various other combinations, modifications, and environments. That is, changes and modifications thereof can be made within the scope of the inventive concept as disclosed in the present specification, the disclosed descriptions and equivalent scopes thereof, and/or the skill or knowledge of the related art. The embodiments described above are intended to explain best modes for implementing the technical spirit of the present disclosure, and various modifications required by the specific applications or uses of the present disclosure can be made. Accordingly, the description is not intended to limit the present disclosure to the embodiments disclosed herein. In addition, it is intended that the appended claims be construed to include alternative embodiments.

What is claimed is:

1. A motor driven air vent device for a vehicle, comprising:
 a plurality of vertical wings simultaneously rotatable to a left or right thereof to be mounted at an outlet within an air duct;
 a motor mounted on an outer surface portion of the air duct;
 a cam plate formed with a guide hole and rotatably located on the outer surface portion of the air duct, wherein the cam plate is formed with the guide hole having two or more continuously connected different guide paths;
 a connection shaft connected between a rotation point of the cam plate and one of the plurality of vertical wings;
 a first link assembly connected between a first output shaft of the motor and the cam plate to deliver a rotational force of the motor to the cam plate;
 a damper mounted to be openable/closable on a rear portion within the air duct;
 a second link assembly connected between a rotary shaft of the damper and the guide hole of the cam plate to rotate the damper from an opened location to a closed location or from the closed location to the opened location when passing through the two or more different guide paths of the guide hole; and
 a control module for applying a drive signal to the motor.

2. The motor driven air vent for the vehicle of claim 1, wherein the motor is provided with a second output shaft in addition to the first output shaft, and the second output shaft is connected with another one of the plurality of vertical wings.

3. The motor driven air vent for the vehicle of claim 1, wherein some of the plurality of vertical wings each has a first hinge pin on the upper surface and a second hinge pin on the lower surface while for two of the plurality of vertical wings, each has a third hinge pin only on the lower surface while having a receptacle on the upper surface for receiving a shaft, and the hinge pins of each vertical wing is hinge-fastened to an upper support link and a lower support link that are fixed to the outlet of the air duct.

4. The motor driven air vent for the vehicle of claim 3, wherein the upper support link is formed with two second fastening holes where the connection shaft extends from the rotation point of the cam plate and the second output shaft of the motor penetrate in addition to first fastening holes to which the first hinge pins are fastened.

5. The motor driven air vent for the vehicle of claim 1, wherein a connection link for simultaneously rotating the plurality of vertical wings is fastened to a central location from an upper surface of each of the plurality of vertical wings.

6. The motor driven air vent for the vehicle of claim 1, wherein the first link assembly comprises:
 a drive link fastened to be angularly rotatable to the first output shaft of the motor; and
 a delivery link having one end portion hinge-connected with the drive link and having another end portion hinge-connected to the cam plate to deliver the rotational force of the drive link.

7. The motor driven air vent for the vehicle of claim 1, wherein the second link assembly comprises:
 a damper opening/closing plate having one end portion, another end portion opposite the one end portion and a central portion between the one end portion and the another end portion, wherein a guide pin is formed on the one end portion and inserted into the guide hole of the cam plate, a connection end is provided on the another end portion, the central portion is hinge-fastened to the air duct; and
 a damper opening/closing link having one end portion hinge-fastened to the connection end of the damper opening/closing plate and having another end portion eccentrically hinge-fastened to the rotary shaft of the damper.

8. The motor driven air vent for the vehicle of claim 7, wherein the rotary shaft of the damper is formed with an eccentric receiving case, and a ball formed on the another end portion of the damper opening/closing link is hinge-fastened to the receiving case.

9. The motor driven air vent for the vehicle of claim 1, wherein the guide hole of the cam plate is composed of a first guide hole formed as a curved guide path to guide the damper to the opened location, and a second guide hole formed as a guide path that is bent on one end of the first guide hole at a predetermined angle to guide the damper to the closed location.

10. The motor driven air vent for the vehicle of claim 9, wherein the cam plate is further formed with a third guide hole that is an additional guide path bent on another end of the first guide hole at a predetermined angle.

11. The motor driven air vent for the vehicle of claim 1, wherein the control module comprises:
 an airflow direction adjustable switch module mounted on a crash pad or steering wheel in front of a driver seat; and
 a controller for receiving an operation signal of the airflow direction adjustable switch module to apply a forward or reverse drive signal to a motor.

12. The motor driven air vent for the vehicle of claim 11, wherein the airflow direction adjustable switch module comprises a left-directional touch switch, a right-directional touch switch, and an auto-operational touch switch, and is configured as a touch sensor module in which a touch sensor is located on a bottom of each of the touch switches.

* * * * *